Oct. 20, 1931.  E. A. MEACHAM  1,828,150
SAW FILING MACHINE
Filed March 25, 1929   6 Sheets-Sheet 1

Fig. 1.

INVENTOR.
Ernest A. Meacham.
BY Townsend, Loftus & Abbett.
ATTORNEYS.

Patented Oct. 20, 1931

1,828,150

UNITED STATES PATENT OFFICE

ERNEST A. MEACHAM, OF OAKLAND, CALIFORNIA

SAW FILING MACHINE

Application filed March 25, 1929. Serial No. 349,566.

This invention relates to machines for filing and setting saws.

It is the principal object of the present invention to generally improve the construction and operation of machines of the character referred to whereby to provide a machine adapted to receive a saw and fitted with operating mechanisms which operate in synchronism to automatically file and set the teeth of the saw regardless of the pitch and tooth dimensions thereof.

In carrying out this object into practice, I provide a machine fitted with a carriage in which a saw is adapted to be clamped. The machine is also fitted with a pair of setting dies and a pair of filing devices, one filing and one setting device being provided at each side of the carriage so that they will operate in opposition to file and set both the right and left-hand teeth of the saw simultaneously. The setting devices, the carriage and the filing devices are operated automatically in synchronism so that when the machine is placed in operation the teeth will be set and filed and the saw advanced through the machine until the operation is completed.

One form which the invention may assume is exemplified in the following description and illustrated by way of example in the accompanying drawings, in which.

Referring more particularly to the accompanying drawings, I have therein illustrated a machine for automatically setting and filing saws regardless of the pitch of the teeth thereof. This machine comprises a frame 10 which supports the various mechanisms of the machine. These mechanisms include a saw carriage or vice 11 which is arranged horizontally and adapted to be advanced step by step when the machine is in operation. Each step of advance of the carriage equals twice the pitch of the teeth of the saw being operated upon. The mechanisms for operating the carriage will be hereinafter more fully described.

The saw carriage or vice 11 is formed of two jaws 11a and 11b which are connected by means of cap screws 12 so that the jaws may be spread to receive a saw and then clamped together to securely hold the saw while the latter is being operated upon. When the saw is arranged in the machine it is arranged with the teeth disposed upwardly and substantially parallel to the line of operation of the carriage.

Figure 3:
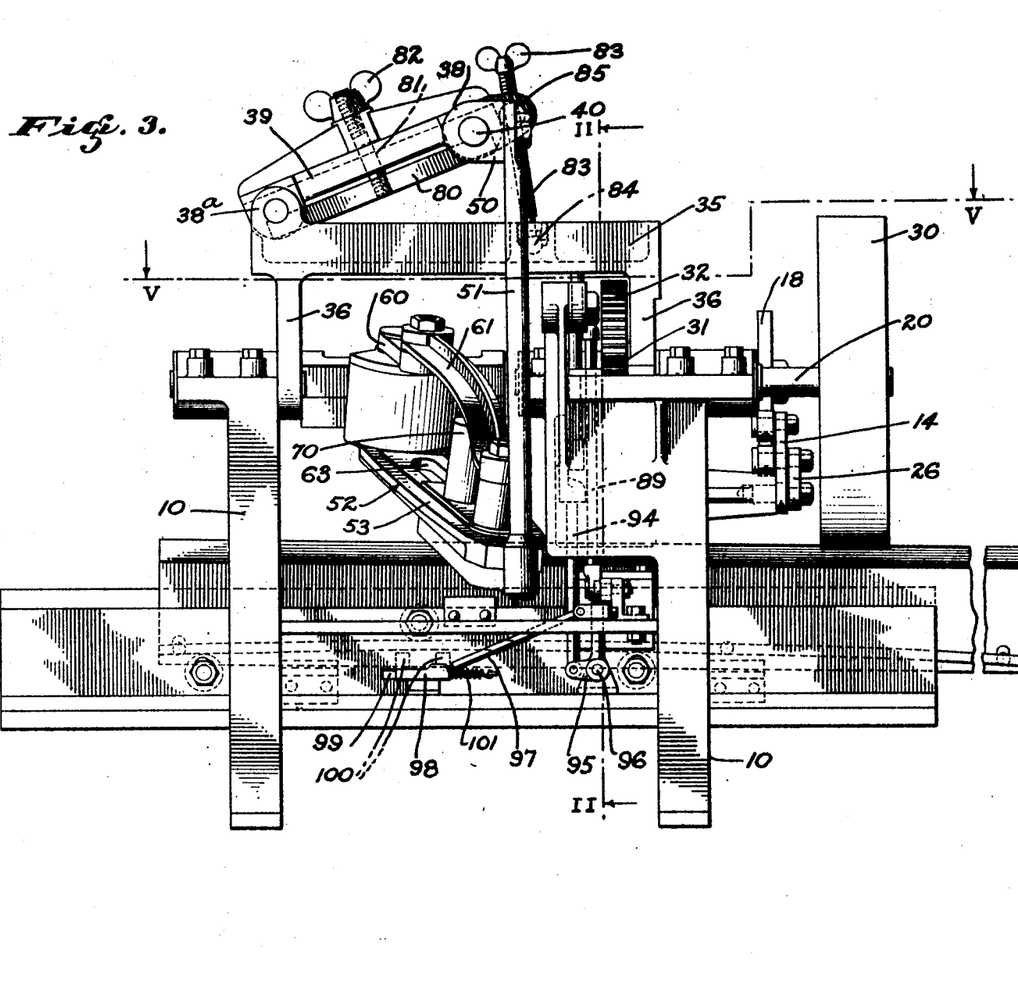
Fig. 3 is a side elevation of the machine.
Figure 4:
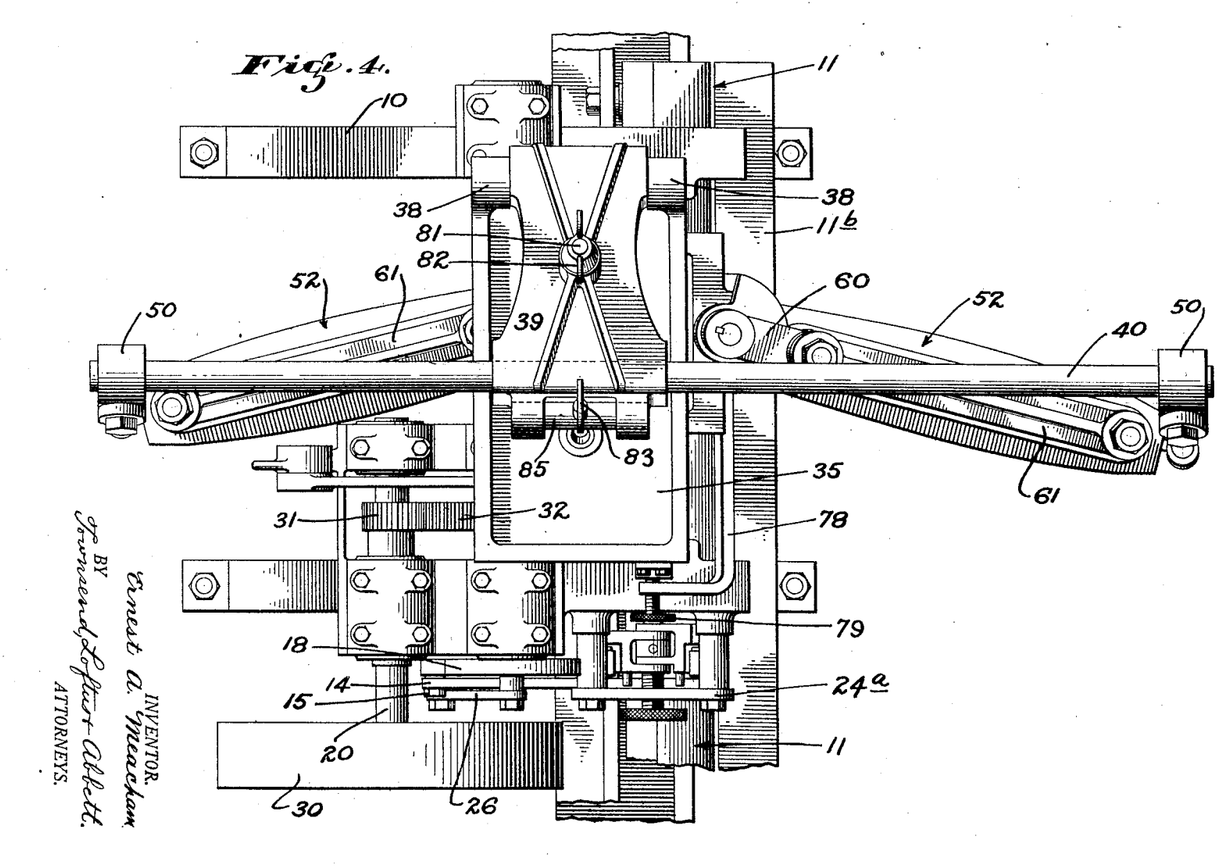
Fig. 4 is a plan view of the apparatus.

The saw carriage or vice 11 is fitted with a lateral guide flange 12a which I prefer to be of flexible material such as steel, so that it can be curved to suit the curvature of the cutting face of some saws. The flange 12a bears upon two rollers 12b and is disposed between these two rollers and an upper roller 12c. The rollers 12b and 12c are adjustably disposed as illustrated in Fig. 3. The connection between the flange 12a and the carriage is such that the flange can be either disposed perfectly parallel to the straight upper edge of the saw carriage or can be curved in an arc parallel to the curved cutting face presented by some saws. It is desired to point out that when the flange 12a is curved to suit the curvature of a saw cutting face, the travel of the carriage is such that the teeth being operated upon are always disposed in the proper plane for operation.

Figure 1:
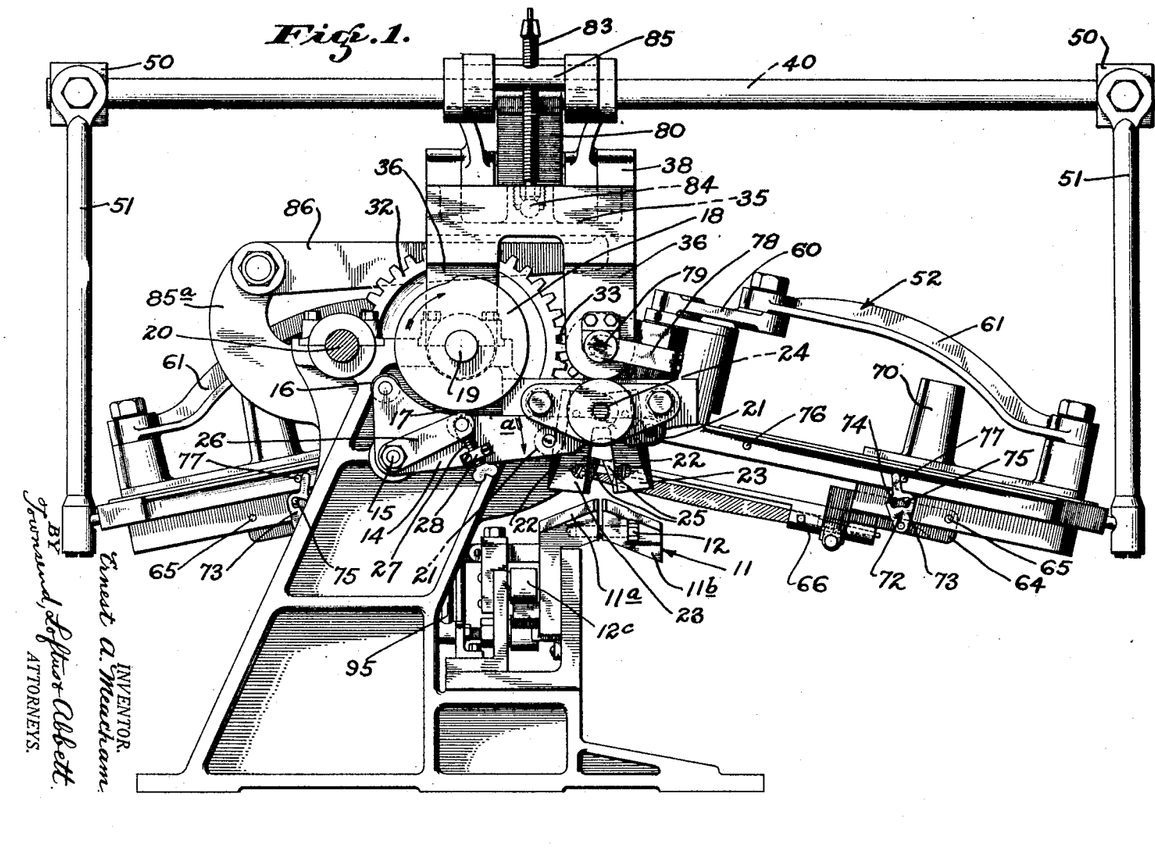
Fig. 1 is an end elevation of a saw filing and setting machine constructed in accordance with my present invention.
Figure 5:
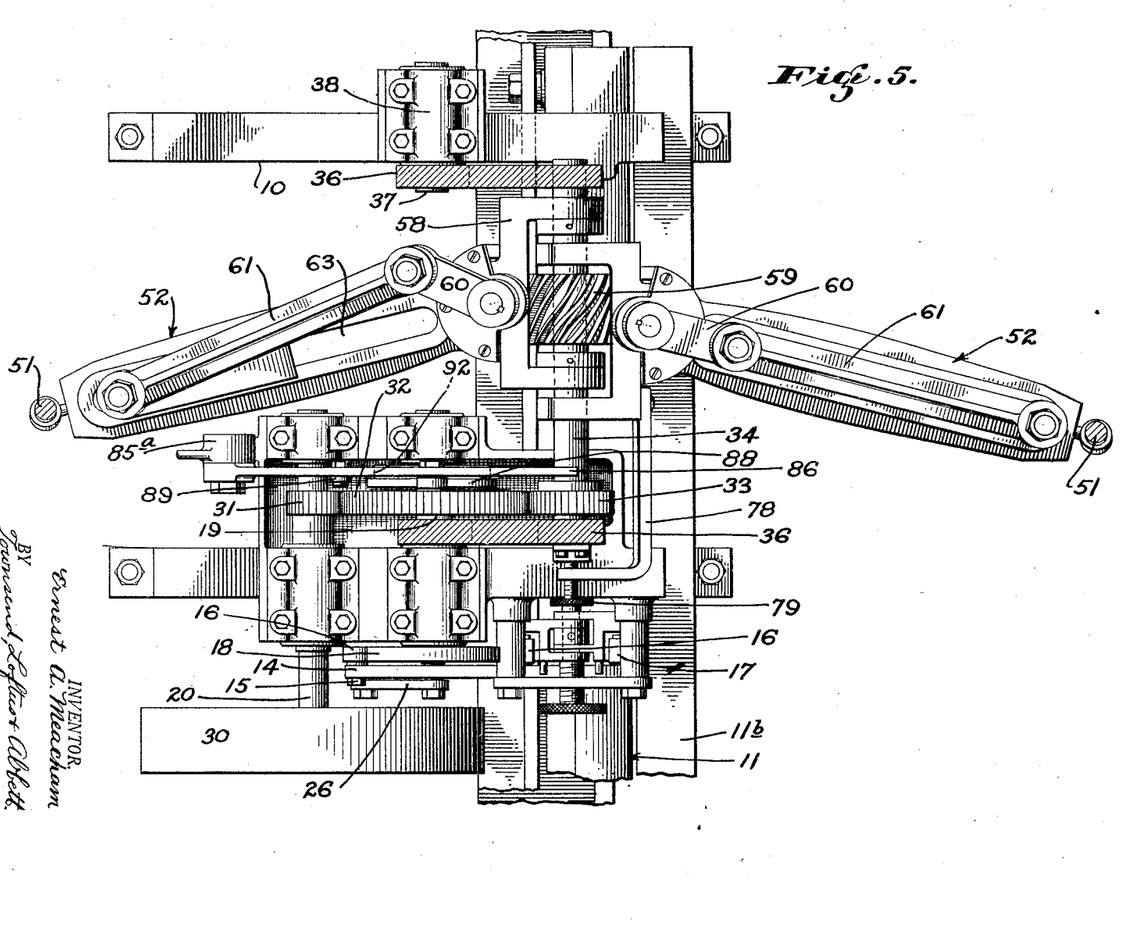
Fig. 5 is a plan section taken on line V—V of Fig. 3.

The setting mechanism of the machine is more clearly disclosed in Figs. 1 and 5. Reference being had to these figures it will be seen that I have provided a pair of opposed pivotal setting jaws 23, which jaws are pivotally supported on a screw 24 threaded through a bridge 24a secured on the frame. The contiguous surfaces of the setting jaws 23 are fitted with angularly disposed setting dies 25. These setting dies 25 are removably secured to the jaws so that they may be removed and substituted by dies of different angularity or pitches so as to adapt the machine to operate on saw teeth of different sizes and pitches.

As is clearly shown in Fig. 1 the setting jaws 23 are adapted to oscillate toward and away from each other in a vertical plane. To operate the jaws at the proper intervals to set teeth of a saw carried in the carriage 11, the outer face of each setting jaw 23 is formed with a cam surface 22. Engaging the cam surfaces of the jaws 23 is a pair of rollers 21 rotatably mounted on a vertically oscillatory lever 14. This lever 14 is pivotally connected to the frame 10 for vertical oscillation at the point indicated by the numeral 15 in Fig. 1.

On opposite sides of its pivotal point the lever 14 is fitted with a pair of cam rollers 16 and 17 which are adapted to engage the periphery of a cam 18 at the proper intervals. This cam 18 is keyed or otherwise secured on a cam shaft 19.

When the rise of the cam 18 passes over the roller 17 the end of the lever 14 carrying the rollers 21 will depress causing the setting jaws 23 to move toward each other. Such operation of the jaws 23 causes the setting dies 25 thereof to engage adjacent saw teeth interposed between the jaws and set them to a proper angle. After the rise of the cam 18 has passed over the roller 17 it will engage the roller 16, moving the end of the lever 14 carrying the rollers 21 upwardly, releasing the jaws and permitting them to spread.

The angle to which the saw teeth are bent by the dies 25 is to some extent determined by the amount of downward movement imparted to the outer end of the lever 14. This movement can be controlled and the amount of set given to the teeth of the saw can be adjusted by adjusting the position of the cam roller 17 with relation to the pivotal point of the lever 14.

To permit the roller 17 to be adjusted it is supported at the end of a lever 26 pivoted upon the pivotal bolt 15 of the lever 14. The roller 17 is mounted at the outer end of the lever 26 and is connected with one end of an adjusting screw 27 threaded through a lug 28 rigidly secured to the lever 14. The adjusting screw 27 is arranged at right angles to the lever 26 so that adjustment of the adjusting screw 27 adjusts the roller 17 relative to the pivotal point of the setting jaw actuating lever 14.

It is obvious from Fig. 1 that by adjusting the position of the cam roller 17 relative to the pivotal point of the lever 14 that the amount of movement of the outer end of the lever 14 can be adjusted and consequently the movement of the setting jaws 23 toward each other can be controlled. It is by this means that I am enabled to impart a given amount of set to the teeth of a saw operated upon by the machine and enable the machine to operate efficiently on saws of various characters.

It should be stated that when the rollers 21 on the lever 14 move upwardly that spring means engaging the setting jaws 23 move them apart so that the saw being operated upon may be advanced for a successive operation.

The cam shaft 19 carrying the cam 18 is driven in synchronism with the remaining mechanisms of the machine from a drive shaft 20 through the medium of a driving pinion 31 on the drive shaft 20 which is in constant mesh with a gear 32 keyed or otherwise secured on the cam shaft 19. The drive shaft 20 may be either directly driven from an electric motor or it may be fitted as here shown with a pulley 30 which may be engaged by a driving belt. The drive shaft 20 as illustrated in the drawings is suitably journalled in bearings carried on the main frame 10.

The drive shaft 20 also drives a file operating shaft 34 through the medium of the pinion 31, the gear 32 and a pinion 33 which is secured on the file operating shaft 34. The file operating shaft mentioned is suitably journalled in a sub-frame 35 which is pivotally supported upon the main frame 10. To pivotally support this sub-frame it is formed with a pair of depending ears 36 at its opposite ends. At one end of the sub-frame the ear 36 is pivotally mounted on a trunnion 37 journalled in a bearing 38. At the other end of the sub-frame the ear 36 is pivotally disposed on the cam shaft 19.

The sub-frame 35 as previously mentioned is supported by the main frame 10 above the machine and acts to support the saw filing mechanism. Reference being had to Fig. 1 it will be seen that the sub-frame 35 includes bearings 38a which are formed at the top of the sub-frame and at one end thereof as illustrated.

The saw filing mechanism includes a supporting member 39 which is pivotally connected at one end to the bearings 38a. This supporting member 39 extends longitudinally of the machine and at its other end it carries a transverse supporting bar 40 which extends upon opposite sides of the machine. At its outer ends the supporting bar 40 is fitted with fixed connectors 50 to which depending arms 51 are pivoted for oscillation transversely of the machine. As these depending arms 51 are pivotally connected to the connectors 50 and the latter are fixed on the transverse supporting bar 40, any rotation of the supporting bar 40 will be at right angles to the line of oscillation of the arms and will change the angle at which the arms 51 depend. The lower ends of the arms 51 are connected to the outer ends of saw filing devices 52 one of which is disposed at each side of the machine as illustrated.

The saw filing devices extend transversely of the machine and each includes a frame 53 which is formed at its inner end with a pair of opposed bearings 54 and 55. These bearings carry a vertically disposed sub-shaft 56 upon which a pinion 57 is formed. A yoke 58 is pivotally disposed on the sub-shaft 56 and is also pivotally connected with the file driving shaft 34 to hold the frame 53 and the pinion 57 in operative relation to the file operating shaft 34 so that the pinion 57 will be in constant mesh with a drive gear 59 keyed on the file operating shaft 34.

It will be noticed that the inner ends of both of the frames 53 are similarly connected with the file operating shaft 34 and are both disposed in operative relation to the gear 59 thereon; that is, the saw filing devices carried by the frames 53 will be operated simultaneously from the gear 59 on the operating shaft 34.

As both of the saw filing devices are constructed and operate in an identical manner, the construction and operation of but one will be hereinafter described.

Figures 6, 7, 8:
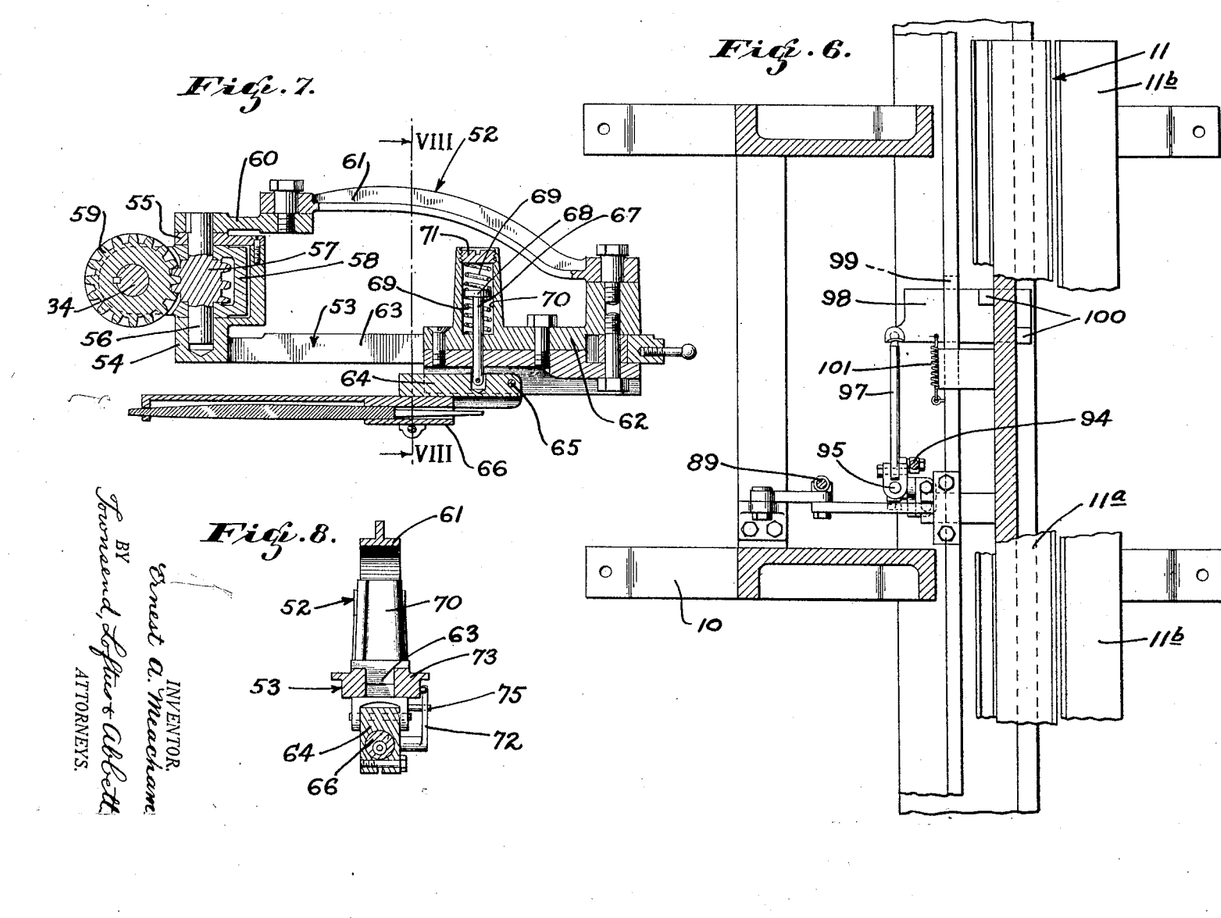
Fig. 6 is a fragmentary view in plan and in section showing the carriage operating machine.
Fig. 7 is a fragmentary view in section through one of the file operating mechanisms.
Fig. 8 is a view in transverse section through one of the file operating mechanisms taken on line VIII—VIII of Fig. 7.

Reference being had to Fig. 7 it will be noticed that the upper end of the sub-shaft 56 is fitted with a crank arm 60 which is keyed thereto. At its outer end the crank arm 60 is pivotally connected to one end of a connecting rod 61. The other end of this connecting rod is connected to a crosshead slide 62 which is reciprocably mounted on the frame 53. For this purpose the frame 53 is formed with a longitudinal slot 63 with which the crosshead slide 62 engages so that the latter will be guided thereby in its reciprocable movement. Pivotally connected to the crosshead slide 62 at the bottom thereof is a file chuck 64 which is pivotally connected thereto as at 65. A file holder 66 is clamped to the chuck 64 and is adjustable with respect thereto toward and away from the saw.

In order to properly suspend the file with relation to the saw in the vice or saw carriage, the file chuck is connected to the lower end of a spring-pressed pin 67 carried by the crosshead slide 62. The pin 67 is formed with a central collar 68 having springs 69 at opposite sides thereof within a cylinder 70 on the crosshead slide 62. At its upper end the cylinder 70 is fitted with an adjustable plug 71 so that the relative tensions of the springs 69 may be changed to cause the file to bear with greater or lesser pressure on the saw.

From the foregoing it is obvious that when the saw is mounted in the machine it is arranged longitudinally thereof and that the filing devices are arranged transversely and the files reciprocate in opposition to each other toward and center of the machine.

It should be stated here that the files bear on the saw only on the inward or cutting stroke thereof. On the outward stroke of the files they are disengaged from the saw by a mechanism which will not be described. This mechanism is most clearly illustrated in Fig. 1 and is indicated by the numeral 72. Each saw filing device is equipped with such a disengaging mechanism and it includes a plate 73 pivotally connected to the file chuck 64. Above its pivotal point this plate 73 is formed with a cam slot 74 engaging a pin 75 secured on the crosshead slide 62. The shaft of this slot 74 is such that when the pin is in its forward or inner end the file will be raised out of contact with the saw and when the pin is at the opposite or outer end of the slot 74 the file will be lowered into contact with the saw. I control this plate 73 by means of a pair of pins 76 and 77 which project outwardly from the sides of the frame 53.

On the inward or cutting stroke of each file the latter is permitted to engage the saw. At the inner end of the cutting stroke the upper extremity of the plate 73 strikes the pins 76 causing the cam slot 74 to cooperate with the pin 75 in disengaging the file from the saw. At the end of the outer stroke of each file the plates 73 strike the pins 77, moving the plates inwardly and causing the cooperating cam slot 74 and pin 75 to lower the files into engagement with the saw for a successive filing stroke.

It is desired to point out that the cam plate 73, its cam slot 74 and the pin 75 also have another function which is that to limit the depth that the file may cut while bearing on the saw during its operating strokes. It will be noticed that the engagement of the pin 75 and the slot 74 limits the downward swinging movement of the file about the pivotal point 65. Thus, the file may cut to a predetermined depth but no more.

The gear ratio between the drive shaft 20, the cam shaft 19 and the file operating shaft 34 is such that the files complete five strokes to one rotation of the cam shaft 19. That is to say, one setting operation is performed for every five strokes of the files.

For the sake of clearness it will be stated that the gear 59 drives the sub-shafts 56 of both saw filing devices through the medium of the pinions 57. The cranks 60 are disposed in opposition and are rotated in opposite directions reciprocating the connecting rods 61. This causes the crossheads of the saw filing devices to be reciprocated simultaneously in opposite directions. As shown in Fig. 5 one crosshead operates slightly in advance of the other so that the cranks will clear.

In order to adjust the distance between the files to accommodate saws of different pitches, one saw filing mechanism or device can be adjusted longitudinally of the machine relative to the other. Reference being had to Fig. 5 it is seen that the yoke 58 of the left-hand saw filing device is collared on the shaft 34. The other yoke 58 of the right-hand saw filing device is adjustable along the shaft 34 so that a proper spacing between the files can be obtained.

An adjustment is obtained by fitting the yoke 58 of the right-hand saw filing device with an extension 78, the end of which is bent at right angles and threaded on an adjusting screw 79. The adjusting screw 79 is arranged in axial alignment with the shaft 34 and is rotatably held in fixed relation to the sub-frame 35. Therefore, rotation thereof will advance or retract the extension 78 and move the yoke 58 axially on the shaft 34. Consequently this will cause a difference of spacing between the files and adjusting them to the pitch of the teeth of the saw being filed.

The cutting edges of adjacent saw teeth are filed at opposite angles and for this reason the opposed saw filing devices are disposed at opposite angles to the longitudinal disposition of the saw. This is clearly shown in the plan view Fig. 5.

The angle of the saw filing devices may be adjusted by mechanism most clearly disclosed in Fig. 3. Reference being had to this figure, it is seen that a clamping bar 80 is disposed beneath the pivotal supporting member 39 and frictionally engages the pivot shaft connecting the supporting member 39 to the bearings 38a. It also frictionally engages the supporting bar 40. The clamping means also includes a stud 81 which is threaded to the center of the clamping bar 80. This stud extends at right angles to the bar 80 through an opening drilled through the pivotal supporting member 39. At its upper end the stud 81 receives a wing nut 82 by means of which the clamping bar 80 may be clamped into position to prevent rotating movement of the supporting bar 40.

The angle at which the supporting member 39 is disposed is controlled by an adjusting screw 83 connected at one end by a ball and socket mechanism 84 to the sub-frame. The other end of the adjusting screw 83 is threaded through a swivel member 85 carried by the free end of the pivotal supporting member 39. As one end of the adjusting screw 83 is anchored to the sub-frame, any rotation thereof will raise or lower the free end of the supporting member 39 with relation to the sub-frame 35. By raising or lowering the free end of the supporting member 39, the vertical angle of the saw filing devices is altered. Also, by releasing the supporting bar 40, the angle at which the saw filing devices are positioned with relation to the saw may be changed by slightly revolving the supporting bar 40 which will swing the lower ends of the depending arms 51 longitudinally and change the position of the outer ends of the saw filing devices relative to the point where they are pivotally connected with the shaft 34. By thus changing the position of the lower ends of the depending arms 51, the angularity of the saw filing devices relative to the saw will be altered.

When these various adjustments have been made to dispose the files at a proper working angle, the bar 80 is returned to clamping position to clamp the bar 40 relative to the pivotal supporting member 39, thus keeping the working angle constant until a second change is desired. By this means the files may be accurately set to cut at any desired angle.

Each cycle of operation includes five complete filing strokes during a portion of the period of which the files are entirely disengaged from the saw and the latter advanced two teeth. This is accomplished by mechanism most clearly disclosed in Fig. 2.

Figure 2:
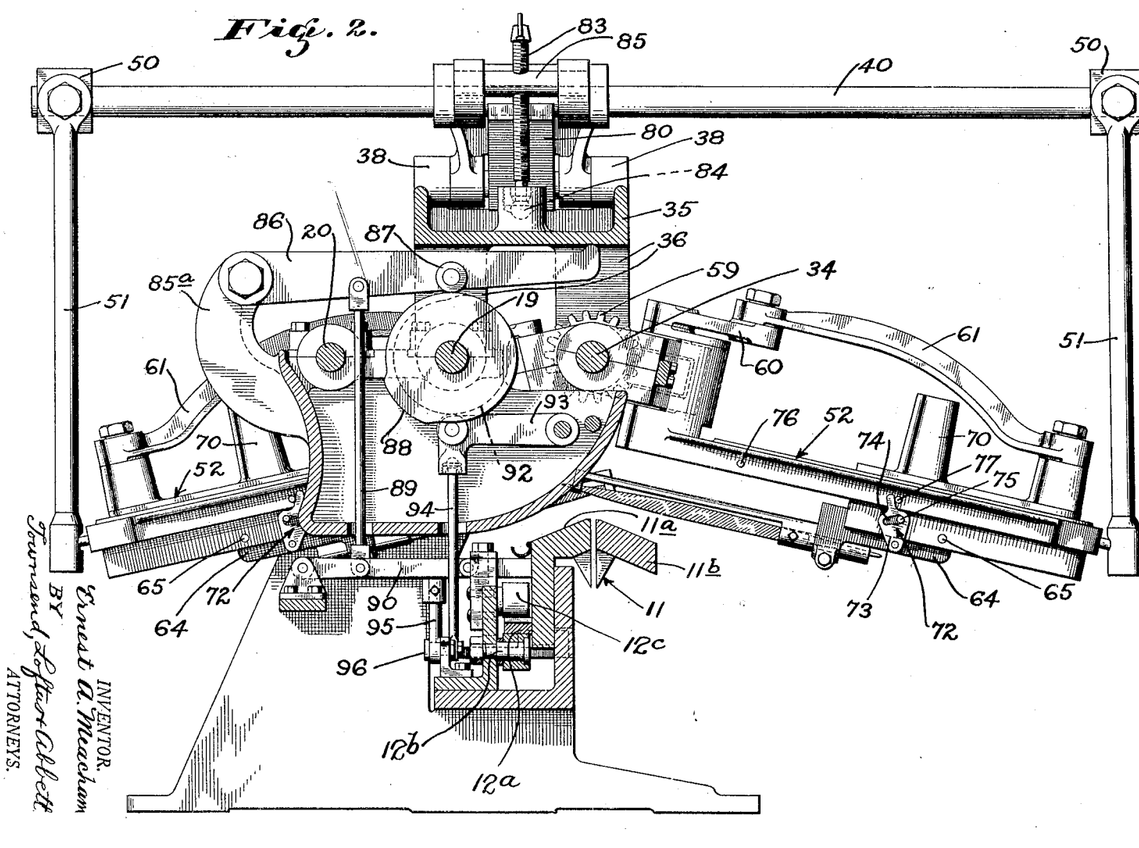
Fig. 2 is a transverse section through the same showing certain details of its construction.

Reference being had to this figure it is seen that an arm 85a is cast integrally with the frame. At its end this arm pivotally supports a raising lever 86 which is connected to the arm 85a at one end. The other end of the raising lever 86 bears against the bottom of the sub-frame 35 at a point outwardly of the pivotal point of the sub-frame 35. This raising lever 86 is fitted intermediate its ends with a cam roller 87 engaging a cam 88 secured on the cam shaft 19. This cam is so formed and positioned relative to the other driving elements of the machine that its swell will engage the roller 87 and elevate the end of the raising lever 86 at the proper intervals to swing the sub-frame 35 about its pivotal point and disengage the files from the saw during each cycle of five complete filing strokes. A rest period is provided on the swell of the cam 88 to maintain the sub-frame elevated and the files out of engagement with the saws during the time that the saw is advanced two teeth or one complete step.

This cam 88 through the medium of the raising lever 86 also locks the saw carriage 11 in position during the filing operation. This is accomplished by the provision of a connecting rod 89 which is pivotally connected at one end to the raising lever 86 and at the other end to a latching lever 90. This latching lever 90 is pivotally connected to one end of the frame as at 91. The lever 90 is a jointed lever and is capable of being extended to its full length when the raising lever 86 is in its lowermost position. When extended to its full length the latching lever 90 bears against the saw carriage 11 and clamps it to the frame to prevent any movement thereof during the filing operation. When the cam 88 raises the lever 86 to disengage the files from the saw the latching lever 90 is contracted and released from engagement with the saw carriage permitting the latter to be advanced two teeth.

After the files have been disengaged from the saw a carriage operating mechanism is automatically brought into operation to advance the saw carriage to position a second pair of teeth for filing. This carriage advancing mechanism is most clearly illustrated in Figs. 2, 3 and 6.

Reference being had to Fig. 2 a cam 92 is secured on the cam shaft 19 and is capable of oscillating an arm 93 at the proper intervals. The free end of this arm 93 is universally connected to one end of a pitman 94 which extends downwardly as shown in Fig. 3. The lower end of this arm is pivoted to a bell crank lever 95 centrally pivoted as at 96 to the frame. The other arm of the bell crank lever 95 extends vertically and is connected at its upper end to one end of a connecting rod 97. At its other end this connecting rod 97 is connected to an advancing shoe 98 operated and guided by slots 99 in the frame. This shoe 98 is formed with two upwardly projecting lugs 100 which are diagonally disposed relative to each other and to the path of travel of the shoe 98.

The path of travel of the shoe 98 is longitudinally of the machine. The disposition of these lugs 100 is such that when the pitman 94 is moved downwardly the bell crank 95 will be swung about its pivot 96 swinging its vertical arm forwardly. This forward movement of the arm of the bell crank 95 will be imparted to the shoe 98. The connection between the connecting rod 97 and the shoe 98 is at one side of the shoe as shown in Fig. 6 so that the depending flange of the saw carriage will be clamped between the lugs 100 in transmitting the forward motion of the shoe to the saw carriage.

After the rise of the cam 92 has passed, the arm 93 (see Fig. 2) swings upwardly and is accompanied in this movement by the pitman 94. This movement of the pitman 94 returns the bell crank lever 95 to normal position retracting the shoe 98. In its return movement, the shoe 98 will release the saw carriage due to the peculiar disposition of the lugs 100. The returning movement of the carriage advancing mechanism is accomplished through the medium of a spring 101.

After the carriage has been advanced to the distance equalling the spacing between two teeth of the saw, the cam 88 lowers the raising lever 86 and clamps the saw carriage into position through the medium of the connecting rod 89 and the latching lever 90 and simultaneously lowers the sub-frame 35 so that the files will engage the saw. It is believed understood that after each advance of the saw, the saw setting mechanism described at the beginning of this description comes into operation and sets the teeth.

In operation of the device, the saw is arranged in the carriage and the filing and setting devices are adjusted to suit the pitch of the teeth of the saw. The machine is then placed in operation and the filing devices and the setting devices will commence to operate. The setting devices will, of course, set the teeth and the saw will advance so that the filing devices will engage the teeth and file them. After a predetermined amount of filing operation the files disengage from the saw and the carriage is advanced a distance equal to the spacing between two teeth. After the carriage has been advanced, the setting and filing mechanisms again come into operation and this cycle is continued until all of the teeth of the saw have been set and filed.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A saw filing machine comprising an operative carriage adapted to receive and support a saw, flexible and adjustable means for guiding said carriage in a path identical to the contour of the cutting edge of the saw, file means supported in operative relation to the carriage and adapted to operate on the teeth of a saw carried by the carriage, means for engaging the files with the saw and reciprocating them to file the saw, means for automatically disengaging the files from the saw after a predetermined cycle of operation, and means for advancing the saw with relation to the files during the period the files are disengaged therefrom.

2. A saw filing machine comprising an operative carriage, a file arranged on opposite sides of the carriage, said files reciprocating in opposite directions, means controlling the operation of the files whereby they will bear on the saw on a cutting stroke only, means for reciprocating the files, means including a pivotally mounted sub base carrying both of said files and movable upwardly and downwardly for simultaneously raising and lowering the files and the actuating mechanism thereof for automatically disengaging the files from the saw to enable the saw to be advanced, means for adjusting the distance between the files, means for adjusting the angularity of the files with respect to the saw.

3. A machine of the character described comprising a carriage adapted to receive and support a saw, a revoluble shaft arranged above the carriage and in parallelism therewith, a pair of saw filing devices supported at one end by said shaft, said saw filing devices including a reciprocable file holder, an operative connection between the shaft and said file holder whereby operation of the shaft will reciprocate the file holder, files carried by said file holders and adapted to engage a saw mounted in the carriage, means for adjusting the angularity of the files with relation to the saw in both the horizontal and vertical plane.

4. A machine of the character described comprising a carriage adapted to receive and support a saw, a revoluble shaft arranged above the carriage and in parallelism therewith, a pair of saw filing devices supported at one end by said shaft, said saw filing devices including a reciprocable file holder, an operative connection between the shaft and said file holder whereby operation of the shaft will reciprocate the file holder, files carried by said file holders and adapted to engage a saw mounted in the carriage, means for adjusting the angularity of the files with relation to the saw in both the horizontal and vertical plane, and means for causing the files to bear with their own weight on the saw on the operating stroke and to disengage from the saw on the return stroke, and means for adjusting the files with relation to each other to accommodate saws of different pitches.

5. A saw filing machine including a carriage adapted to receive and support a saw, opposed saw filing devices arranged upon opposite sides of the carriage, files carried by said saw filing devices and adapted to be reciprocated to file a saw supported by the carriage, means for causing said files to bear on the saw during the operative strokes thereof and to disengage from the saw during the return strokes thereof, means for limiting the depth of the cut of said files, and a pivotally mounted support located above and carrying both of said saw filing devices for simultaneously raising and lowering the same to permit the saw carriage to be fed forwardly.

6. A saw filing machine including a carriage adapted to receive and support a saw, opposed saw filing devices arranged upon opposite sides of the carriage, files carried by said saw filing devices and adapted to be reciprocated to file a saw supported by the carriage, means for causing said files to bear on the saw during the operative strokes thereof and to disengage from the saw during the return strokes thereof, means for adjusting the angularity of the files with relation to the saw both horizontally and vertically, means for predetermining the maximum depth that the files may cut on the saw, and a pivotally mounted support located above and carrying both of said saw filing devices for simultaneously raising and lowering the same to permit the saw carriage to be fed forwardly.

ERNEST A. MEACHAM.